(12) United States Patent
Mira

(10) Patent No.: US 8,145,364 B2
(45) Date of Patent: Mar. 27, 2012

(54) METHOD AND DEVICE FOR AIDING THE RESTORAL OF COMMAND OF A MOVING VEHICLE BY AN OPERATOR OF THE VEHICLE

(75) Inventor: Loïc Mira, Toulouse (FR)

(73) Assignee: Thales (FR)

( * ) Notice: Subject to any disclaimer, the term of this patent is extended or adjusted under 35 U.S.C. 154(b) by 1071 days.

(21) Appl. No.: 11/963,567

(22) Filed: Dec. 21, 2007

(65) Prior Publication Data

US 2008/0154439 A1 Jun. 26, 2008

(30) Foreign Application Priority Data

Dec. 22, 2006 (FR) ...................................... 06 11259

(51) Int. Cl.
*B64C 19/00* (2006.01)
*G05D 1/00* (2006.01)
(52) U.S. Cl. ............. 701/3; 701/11; 701/33.7; 244/197; 244/75.1; 340/943; 340/963
(58) Field of Classification Search ........ 701/8; 244/195
See application file for complete search history.

(56) References Cited

U.S. PATENT DOCUMENTS

| | | | |
|---|---|---|---|
| 5,444,837 A | | 8/1995 | Bomans et al. |
| 6,708,091 B2 * | | 3/2004 | Tsao .................................. 701/9 |
| 7,400,951 B2 * | | 7/2008 | Artini et al. ........................ 701/3 |
| 7,693,614 B2 * | | 4/2010 | Turung ............................. 701/3 |
| 2003/0128122 A1 * | | 7/2003 | Reynolds ..................... 340/573.1 |
| 2003/0225489 A1 | | 12/2003 | Tsao |
| 2005/0216138 A1 | | 9/2005 | Turung |
| 2006/0032987 A1 * | | 2/2006 | Akers et al. .................... 244/175 |
| 2007/0050101 A1 * | | 3/2007 | Sacle et al. ....................... 701/11 |
| 2007/0221782 A1 * | | 9/2007 | Cerchie et al. ................ 244/75.1 |

\* cited by examiner

*Primary Examiner* — Thomas Black
*Assistant Examiner* — Lin B Olsen
(74) *Attorney, Agent, or Firm* — Lowe Hauptman Ham & Berner, LLP

(57) ABSTRACT

The fields of the invention are vehicle on-board security and vehicle piloting safety. The invention relates to a method and device for aiding the restoral of command of a vehicle by an operator of the vehicle. The command of the vehicle by the operator is ensured through vehicle piloting controls, when the operator has lost command of the vehicle in favor of a device for disabling piloting controls. The device disables the action of the piloting controls on the piloting means during the loss of command. According to the invention, the method includes emitting a restoral of command request; a vehicle motion phase is determined; a reference state of the piloting control is determined as a function of the motion phase; a current state of the piloting control is determined; the current state with the reference state is compared so as to identify a deviation Δ between the current state and the reference state. When no deviation Δ is identified, the command of the vehicle by the operator is restored. When a deviation is identified, alert messages are determined to be communicated to the operator to warn him of this deviation and a priority level with each alert message is associated. The previous steps from the second step onward are repeated.

17 Claims, 4 Drawing Sheets

| $C_P$ | $M_P$ | $S_R$ |
|---|---|---|
| Engines | TAKE OFF | ON |
| | CRUISE | ON |
| | DESCENT | ON |
| | APPR/LAND | ON |
| Throttle | TAKE OFF | FLX-MCT-TOGA |
| | CRUISE | CL-IDLE |
| | DESCENT/APPR | IDLE |
| | LAND | REVERSE |
| Vertical speed | TAKE OFF | > 0 |
| | CRUISE | < Vz0 |
| | DESCENT | < Vz0 |
| | APPR/LAND | < Vz0 |
| Air speed | TAKE OFF | > Vr |
| | CRUISE | > Vs0 |
| | DESCENT | > Vs0 |
| | APPR/LAND | 150 kts > V > Vs0 |
| Heading | TAKE OFF | CHECK |
| | CRUISE | CHECK |
| | DESCENT | CHECK |
| | APPR/LAND | CHECK |
| Engine thawing | TAKE OFF | ON |
| | CRUISE | ON |
| | DESCENT | ON |
| | APPR/LAND | ON |
| Slats/flaps | TAKE OFF | 1-2-3 |
| | CRUISE | 0 |
| | DESCENT | 2-3 |
| | APPR/LAND | 2-3-FULL |
| Aero-brakes | TAKE OFF | DOWN |
| | CRUISE | DOWN |
| | DESCENT/APPR | DOWN-HALF |
| | LAND | FULL |
| Undercarriage | TAKE OFF | DOWN |
| | CRUISE | UP |
| | DESCENT | UP |
| | APPR/LAND | DOWN |
| Barometer benchmark | TAKE OFF | QFE |
| | CRUISE | QNH |
| | DESCENT | QNH |
| | APPR/LAND | QFE |

FIG.4

METHOD AND DEVICE FOR AIDING THE RESTORAL OF COMMAND OF A MOVING VEHICLE BY AN OPERATOR OF THE VEHICLE

RELATED APPLICATIONS

The present application is based on, and claims priority from, French Application Number 06 11259, filed Dec. 22, 2006, the disclosure of which is hereby incorporated by reference herein in its entirety.

TECHNICAL FIELD

The fields of the invention are security on board moving vehicles and also vehicle piloting safety.

BACKGROUND OF THE INVENTION

The invention is of particular interest when a moving vehicle, being used to transport passengers, is equipped with a security device guaranteeing the integrity of the vehicle in the event of the operator of the vehicle being assaulted by some of the passengers. The vehicle is piloted by an operator who acts on piloting controls to pilot the vehicle. The security device comprises a device for disabling the piloting controls.

The invention is also of particular interest when the moving vehicle is equipped with a device for assisting the piloting of the vehicle, guaranteeing the safety of the vehicle in the event that the vehicle is detected as facing a dangerous and imminent situation. The vehicle is piloted by an operator who acts on piloting controls to pilot the vehicle. The security device comprises a device for disabling the piloting controls.

For a moving vehicle piloted by an operator, there are several situations in which a device for disabling piloting controls is led to deactivate the command of the vehicle by the operator. These situations are related to the security or safety of the vehicle. A first example that may be cited is that of an aircraft piloted by a crew, transporting passengers when an assault is committed by certain passengers on the crew of the aircraft in order to take command of the aircraft. A second example that may also be cited is a situation in which a forecast is made of imminent collision of the aircraft with a terrain obstacle if no aircraft trajectory modification is made by the crew, and it is apparent that the crew cannot carry out such a trajectory modification.

In the first example cited, the disabling device acts for security reasons, on the one hand to relieve the crew of their piloting task while they are subjected to very heavy psychological pressure, on the other hand to prevent those committing the assault from being able to take command of the aircraft in the event that the assault is successful.

In the second example cited, the disabling device acts to ensure the safety of the aircraft and compensate for either a failure of the crew, or a failure of the piloting controls, which makes it imperative to carry out a fast manoeuvre to avoid the obstacle, for example by means of an automatic vertical resource.

A phase of loss of command of the vehicle starts on detecting an alert of imminent danger. As soon as it begins, the device for disabling the piloting controls deactivates the piloting controls in respect of the operator and simultaneously ensures the piloting of the vehicle in replacement for the operator. The loss-of-command phase can come to an end the moment the circumstances which have contributed to making it arise have disappeared. The loss-of-command phase is intended to remain temporary, command of the vehicle having to be returned to an operator as soon as possible.

The restoral of command of the vehicle by the operator absolutely must be preceded by checks on the current state in which the piloting controls have been placed during the loss-of-command phase. Specifically, the piloting controls might have been placed for the duration of the loss-of-command phase in a state which imperils the vehicle if full authority of the piloting controls is restored. It is therefore necessary that a device for aiding the restoral of the command of a moving vehicle ensures that the piloting controls are in a current state which complies with the current vehicle motion phase before reactivation of operator command.

A device for disabling a vehicle's piloting controls is a recent item of equipment meeting new expectations in terms of vehicle safety and security. The requirement to associate with it a device for aiding the restoral of operator command so as to take care that the restoral occurs without injury to the passengers of the vehicle has appeared more recently still.

The aim of the invention is to propose a solution to the new problem presented by the restoral of the command of a vehicle by an operator, following an opening of a phase of loss of command of the vehicle.

SUMMARY OF THE INVENTION

More precisely the subject of the invention is a method for aiding the restoral of command of a moving vehicle by an operator of the vehicle, the command of the vehicle by the operator being ensured through vehicle piloting controls CP acting on piloting means, the operator having lost command of the vehicle in favour of a device for disabling piloting controls CP, the said device disabling the action of the piloting controls CP on the piloting means during the loss of command, characterized in that it comprises the following steps consisting in:

Step A: Emitting a request to restore command of the vehicle destined for the operator;

Step B: Determining a vehicle motion phase $P_M$;

Step C: For each piloting control CP, determining a reference state $S_R$ of the piloting control CP as a function of the motion phase $P_M$;

Step D: For each piloting control CP, determining a current state $S_C$ of the piloting control CP;

Step E: For each piloting control CP, comparing the current state $S_C$ with the reference state $S_R$, so as to identify a deviation $\Delta$ between the current state and the reference state;

Step F: When no deviation $\Delta$ is identified, the command of the vehicle by the operator is restored;

Step G: When a deviation is identified, determining alert messages to be communicated to the operator to warn him of this deviation and associating a priority level with each alert message;

Step H: Repeating steps B to G.

A first advantage of the method according to the invention is that it makes it possible to restore the command of a vehicle while being certain that no flight control is placed in a current state which will endanger the vehicle during the restoral of command. The command of the vehicle is returned to the operator only when it is certain that each piloting control of the vehicle is in a current state which does not place the vehicle in a dangerous situation.

A second advantage of the method according to the invention lies in the assistance that it provides to the operator of the vehicle so that command is best restored. In particular the method according to the invention provides the operator, in the form of a procedure DO_LIST, with a list of flight controls whose current state has to be checked. The operator must be certain that these flight controls are in a state compatible with a restoral of command of the vehicle by the operator having regard to the fact that the vehicle is in a given motion phase.

The invention also relates to a device for aiding the restoral of command of a moving vehicle by an operator of the vehicle, implementing a method according to the invention, characterized in that it comprises means for receiving a restoral of command authorization cue;
means for storing reference states of the controls for piloting the vehicle as a function of vehicle motion phase;
means for comparing the current state of a piloting control with the reference state of the same piloting control so as to identify a deviation between the current state and the reference state;
means for determining alert messages to be communicated to the operator to warn him of the existence of a deviation and for associating a priority level with the message.

A first advantage of the device according to the invention lies in the capability that it has of being integrated with existing devices for failure message management.

A second advantage of the device according to the invention lies in the compatibility of its structure with a double check at one and the same time human and electronic, for example, when there are two operators in charge of piloting the vehicle. A first check is human, it is executed by a first and a second operator (for example a co-pilot and a pilot); the device according to the invention confirms the actions carried out by the first and the second operator. The first operator reads aloud a list of actions to be undertaken to return the vehicle to an appropriate configuration to avoid a dangerous transition ("checklist"). The second operator executes the operation and answers the first operator, also aloud. Finally, the device according to the invention validates on graphical pages the actions as and when they are executed.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 4 represents, in the form of a table, an exemplary configuration database for piloting controls of an aircraft.

DETAILED DESCRIPTION OF THE INVENTION

Figure 1:
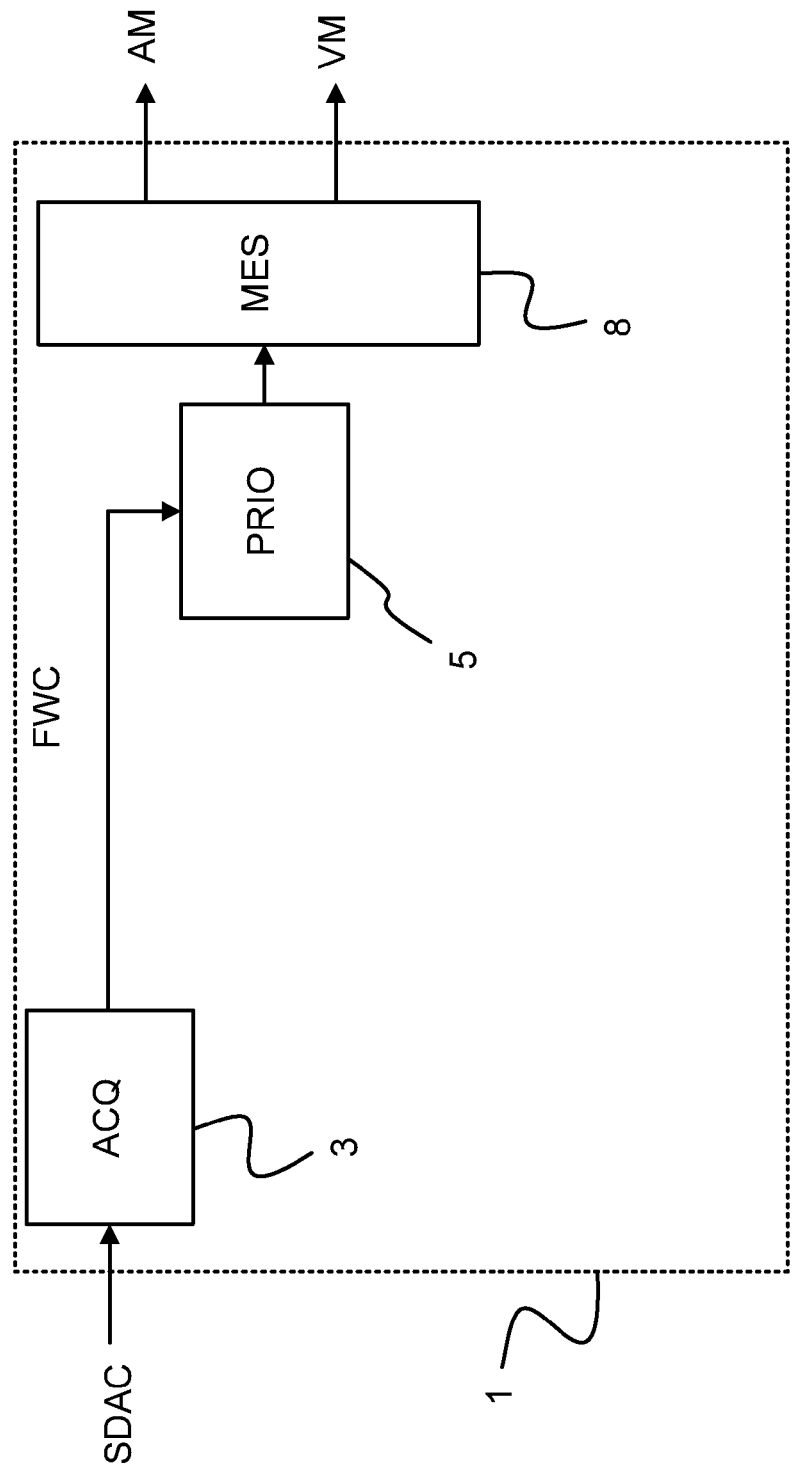
FIG. 1 schematically represents a failure message management device of the prior art.

FIG. 1 represents a failure message management device FWC, 1 of the prior art. Such devices are known for example by the term "Flight Warning Computer" (or the acronym FWC) or else "Electronic Centralized Aircraft Monitoring" (or the acronym ECAM). A moving vehicle which is piloted by an operator is equipped with the device. The vehicle is not represented in the figure. The device FWC, 1 comprises:

an information centralizing device ACQ, 3;
an alert messages hierarchization device PRIO, 5;
a module MES, 8 for emitting alert messages destined for the operator of the vehicle.

The information centralizing device ACQ, 3 gathers cues delivered by various members of the vehicle or originating from a possible intermediate concentrator of cues (e.g., a System Data Acquisition Concentrator, SDAC), which is not represented in the figure. The device ACQ, 3 thereafter determines whether these cues should form the subject of a communication to the operator. If this is the case, it formulates an alert message and associates a priority level $N_{p1}$ with it, for example a number lying between 1 and 10 to indicate the criticality level of the message.

For example the lower the priority level $N_{p1}$ of a message, the higher the criticality level of this message so that it must be presented rapidly to the operator.

An example of a cue gathered by the device ACQ, 3, is, for a motor vehicle, a cue relating to the quantity of fuel available in tanks of the vehicle. This cue is gathered periodically, and when the quantity of fuel is less than a predefined threshold, an alert message is formulated destined for the operator. The priority level assigned to an alert message is dependent on the subject of the message (quantity of fuel remaining) and the numerical cue transmitted (for example, 5 liters). The priority level of the message indicating that the quantity of fuel is less than 5 liters is naturally of greater priority than the priority level of the message indicating that the quantity of fuel is less than 10 liters.

Because of the very high number of alert messages generated by the device ACQ, 3, it is not possible to communicate them all to the operator as soon as they are formulated by the information centralizing device ACQ, 3. The device PRIO, 5 orders the alert messages according to their priority level with a view to presenting them to the pilot in an order which is dependent on their criticality.

The transmission module MES, 8 formats the messages with a view to their transmission to the operator. These messages are transmitted either:

in audible form AM, by means of loudspeakers fitted to a piloting cabin in which the operator sits, or
in visual form VM, by means of flashing indicator lights, or information displays as text characters displayed on screens of the piloting cabin.

Figure 2:
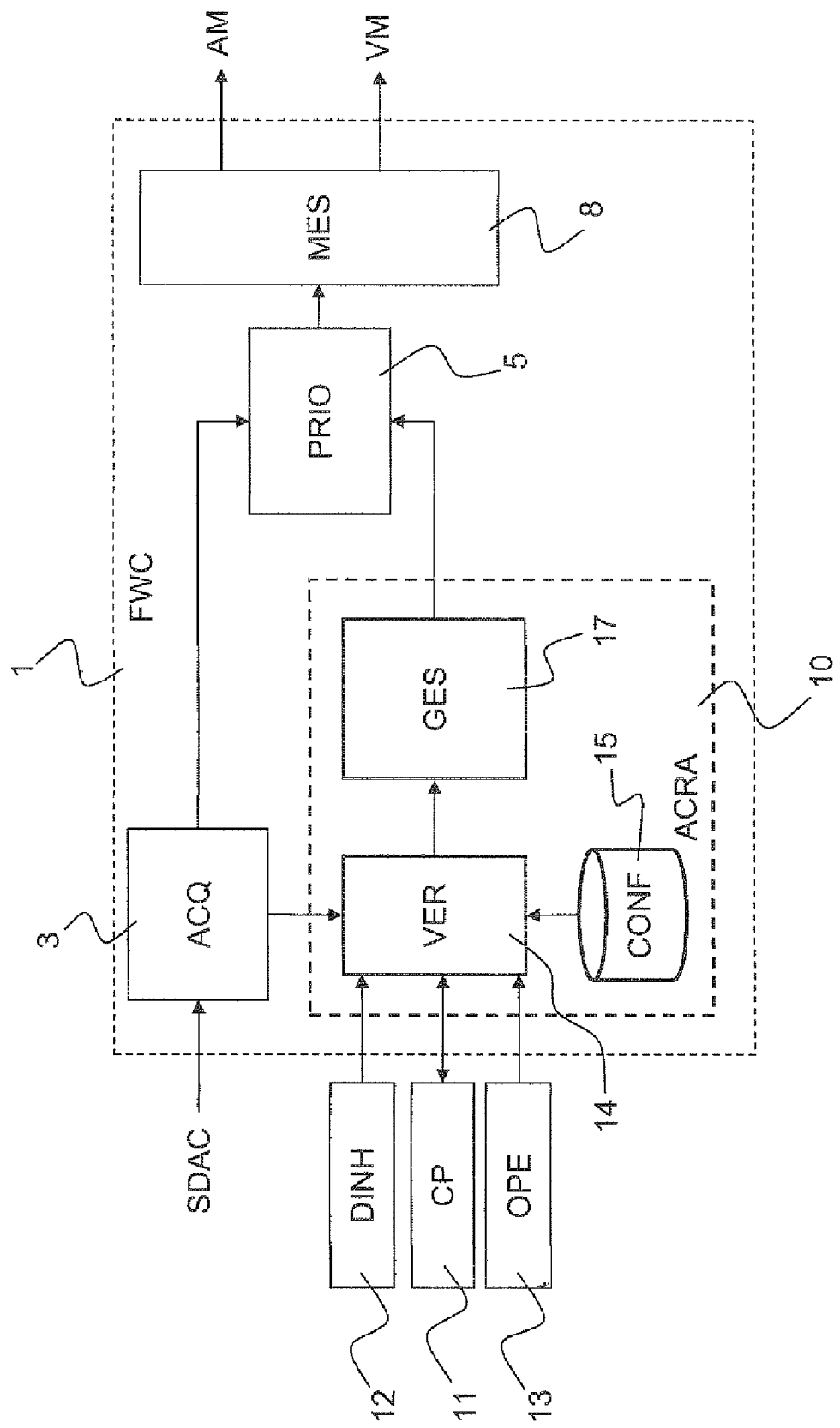
FIG. 2 schematically represents a vehicle failure message management device comprising a device for aiding the restoral of command of a vehicle according to the invention.

FIG. 2 represents a failure message management device FWC, 1 comprising a device ACRA, 10 for aiding the restoral of command of a vehicle according to the invention. The device FWC, 1 equips a moving vehicle which is piloted by an operator. For this purpose, the operator activates piloting controls CP, 11 which act on piloting means. The vehicle and the piloting means are not represented in the figure.

Advantageously, the device ACRA is integrated with a vehicle failure message management device.

Advantageously, the device ACRA, 10 comprises:

means VER, 14 for reading a restoral of command authorization cue;
means for determining current states $S_C$ of the vehicle piloting controls CP;
means for storing reference states $S_R$ of the piloting controls CP as a function of a vehicle motion phase $P_M$;
means for determining a vehicle motion phase $P_M$;

means for comparing the current state $S_C$ of a piloting control CP with the reference state $S_R$ of the same piloting control CP so as to identify a deviation Δ between the current state $S_C$ and the reference state $S_R$;

means GES, 17 for determining alert messages to be communicated to the operator and associating a priority level with the messages, the alert messages warning the operator of the existence of a deviation Δ.

In FIG. 2, is furthermore represented a device DINH, 12 for disabling the flight controls. This device DINH disables actions of the operator on flight controls, thus rendering inoperative the command of the motion of the vehicle by the operator. Improperly, the expression "disabling of the flight controls" will be used later on.

The disabling of the flight controls by the device DINH is triggered by sensors, not represented. The sensors detect for example suspicious activity in a piloting cabin, or in a passenger cabin of the vehicle, or else highlight that the vehicle is in a serious situation and that the operator of the vehicle does not seem to be able to extricate it from this situation.

The disabling of the flight controls is accompanied by an action on means for piloting the vehicle so as to act on its motion and substitute an automatic command for the command of the motion of the vehicle exerted by the operator.

As has been said, a loss of command of the vehicle by the operator is not a situation to be prolonged more than necessary.

As soon as a vehicle loss-of-command phase is open, the device DINH, 12 examines, periodically, whether the situation which has given rise to the opening of the loss-of-command phase persists: as soon as the situation ceases, a phase of restoral of command of the vehicle by the operator is entered.

For example, in the case of the aircraft, onboard sensors in a passenger cabin exhibit a cue regarding agitation of the passengers, the device DINH for disabling the piloting controls receiving this cue, disables the flight controls and ensures piloting of the aircraft. When the sensors make it possible to establish that calm has returned to the passenger cabin, the disabling device DINH dispatches to the operator, here the pilot of the aircraft, a request to close the loss-of-command phase. The onboard sensors are for example digital cameras with which are associated image analysis processing operations for highlighting movements.

The situation is identical on detecting an imminent collision of an aircraft with a terrain obstacle on the basis of a signal of a flight management device supplied with signals originating from an obstacle detection device. In such a situation, the disabling system DINH disables the flight controls and ensures piloting of the aircraft, for example by imparting a vertical resource on the aircraft. As soon as the threat of collision has receded, it is possible to attempt to close the loss-of-command phase.

Thus, as soon as it is apparent that the command of the vehicle can be returned to the operator, the device DINH delivers an operator loss-of-command phase closure request. This request is received by the means VER, of the device ACRA, 10. If in a state to do so, the operator of the vehicle acknowledges the request, for example by manually validating a visual interface again by the means VER.

Figure 3:
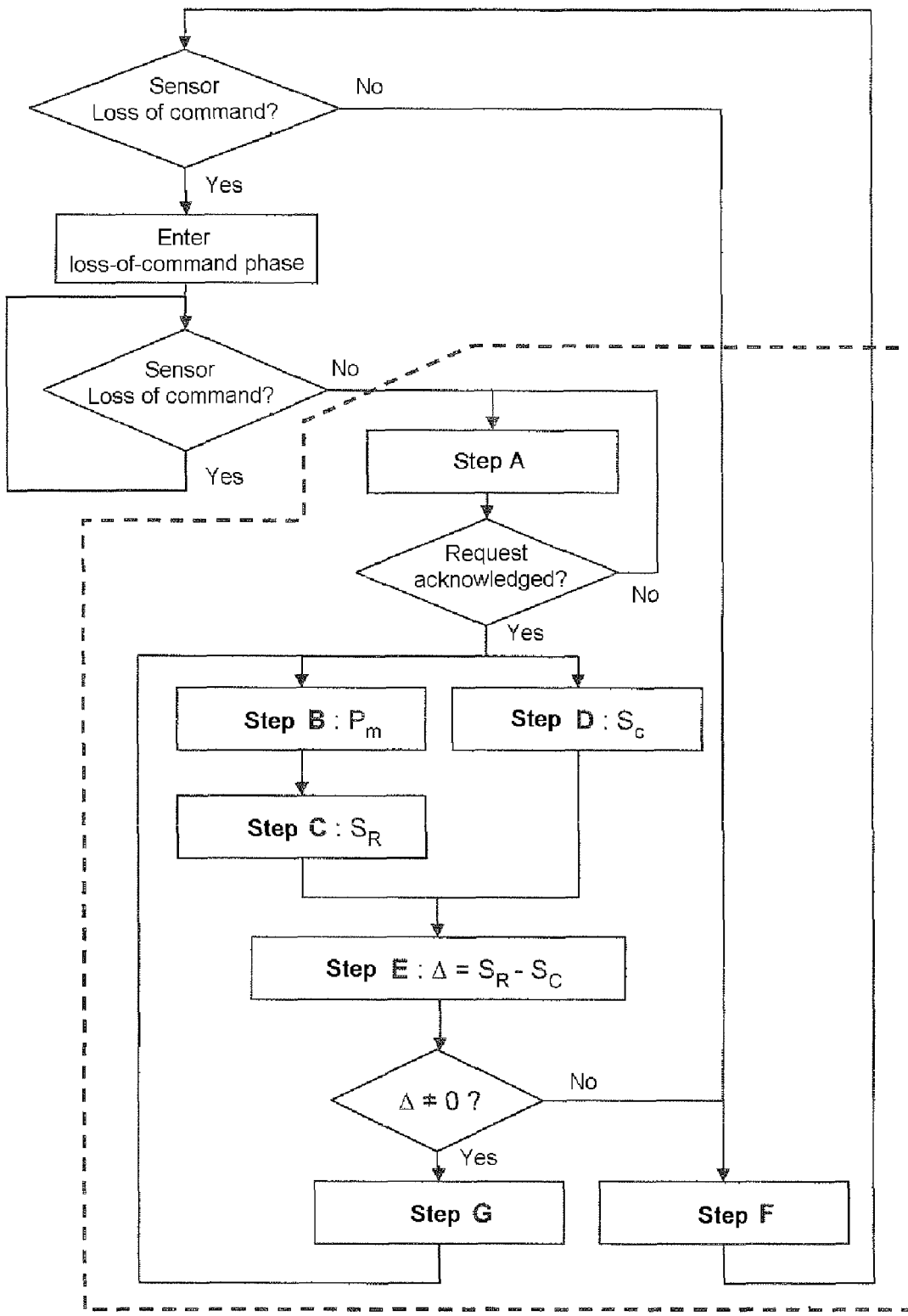
FIG. 3 represents a flowchart of a method for aiding the restoral of command of a vehicle according to the invention.

The acknowledgement of the operator constitutes a first step (step A) of the method for aiding the restoral of the command of the operator according to the invention. An exemplary flowchart of this method is represented in FIG. 3, it comprises steps which are joined by a contour represented by dashes in this figure. In accordance with this flowchart, subsequent to step A, two steps are executed in parallel: a step D and a step B.

Step D consists in gathering a current state of the vehicle piloting controls CP on which the operator can act to ensure a command of the motion of the vehicle. These piloting controls CP have been disabled by the device DINH, 12 as soon as the loss-of-command phase was entered.

The state of a piloting control CP is usually a discrete with several levels. For example, an aircraft propulsion engine possesses two levels: either "ON" (i.e. "running") or "OFF" (i.e. stopped). On the other hand a slats/flaps configuration for an aircraft can comprise five levels, respectively dubbed "0, 1, 2, 3, FULL" which represent as many configurations of inclinations of slats and flaps of the aircraft.

Step B of the method according to the invention consists in gathering via the module ACQ, 3 a vehicle motion phase $P_M$. The motion phase describes a type of motion of the vehicle, for example for an aircraft, one usually distinguishes a takeoff phase ("TAKE-OFF"), a cruising phase ("CRUISE"), a descent phase ("DESCENT") and an approach/landing phase ("APPR/LAND").

Knowing the vehicle motion phase $P_M$, a typical state $S_R$ which the piloting control CP of the vehicle must be in when the vehicle is in the motion phase $P_M$ is determined thereafter, in the course of a step C. A typical state $S_R$ for a piloting control CP is stored in a configuration database CONF, 15.

In FIG. 4 is represented an exemplary configuration database CONF, 15 for a passenger transport aircraft. For each piloting control CP (first column), the database CONF groups together one or more reference states $S_R$ (third column) as a function of each motion phase (second column) of the vehicle.

Step E of the method according to the invention consists in measuring a deviation Δ between a reference state $S_R$ and a current state $S_C$ of each piloting control CP.

In certain cases, there is no reference state $S_R$ for the HEADING piloting control, as for example for the "heading" piloting control which is aimed at assigning a heading value to the aircraft.

Specifically, it is not possible to fix a priori a heading value that it would be desirable for the aircraft to have upon restoral of the command by the operator. For this example, the aim is only to remind the operator to check that the heading value followed by the aircraft will not give rise to difficulties.

For other piloting controls the reference state $S_R$ is described by a logic criterion: for example ">Vr" for the "air speed" piloting control in the "TAKE-OFF" motion phase. In this case, the measurement of the deviation Δ between the reference state $S_R$ and the current state $S_C$ consists in testing whether the current state $S_C$ meets the criterion fixed by the reference state $S_R$.

Vz0 corresponds to a vertical stall speed;
Vr corresponds to a Rotation speed;
Vs0 corresponds to a stall speed with respect to the air;
The speeds Vz0, Vr, Vs0 are values which are determined by systems on board the aircraft as a function of the aircraft's motion phase and of results delivered by sensors, likewise on board.

The engines of the aircraft can have two current states $S_C$, "ON" or "OFF", which correspond respectively to engines operational or stopped.

The throttles can have six different current states $S_C$: FLX, MCT, TOGA, IDLE, CL, REVERSE. The first five of them correspond to motions of the aircraft in flight, the sixth current state relates exclusively to the "APPR/LAND" motion phase during which a deceleration is necessary.

The aero-brakes can have three different current states $S_C$, DWN, HALF and FULL; the undercarriages can have two; "DOWN" and "UP"; which correspond respectively to "undercarriage extended" and "undercarriage retracted". Finally, the "Barometer benchmark" piloting control can have two different current states $S_C$, QFE and QNH.

Advantageously, a deviation $\Delta$ is a difference between a reference state $S_R$ and a current state $S_C$ and a deviation is identified when the value of $\Delta$ is different from 0.

When the current state $S_C$ corresponds to the reference state $S_R$ for all the vehicle piloting controls CP, the vehicle is considered safe immediately after the piloting controls are reactivated: for this reason, it is on this condition alone that the command of the vehicle is returned to the operator by the disabling device DINH.

Conversely, when there is a non-zero deviation between the reference state $S_R$ and the current state $S_C$, the vehicle is in danger immediately after the piloting controls are reactivated: for this reason, the command of the vehicle is not returned to the operator. In this case, the means GES, 17 formulate alert messages with which is associated a priority level $N_{p2}$ which can be compared with priority levels $N_{P1}$ gathered by the information centralizing device ACQ, 3.

An exemplary priority level $N_{p2}$, again for an aircraft's piloting controls, is given in the table below:

| CP | $N_{p2}$ |
|---|---|
| Engines | 1 |
| Throttle | 2 |
| Vertical Speed | 3 |
| Air speed | 4 |
| Heading | 5 |
| Engine Thawing | 6 |
| Slats/Flaps | 7 |
| Aero-Brakes | 8 |
| Undercarriage | 9 |
| Barometer Benchmark | 10 |

When $N_{p2}$ is equal to 1 or 2: there is an imminent risk of loss of the aircraft. These priority levels are attained notably when the aircraft's propulsion engines are shut down (current state $S_C$ equaling "OFF"), or when the throttles are in the REVERSE position while the aircraft is in the CRUISE motion phase.

When $N_{p2}$ is equal to 3 or 4: there is a risk of loss of the aircraft if there is no immediate operator action. When $N_{p2}$ is equal to 5: there is a possibility of loss of the aircraft if there is no immediate operator check. When $N_{p2}$ is equal to 6: there is a possibility of loss of the engines if there is no operator check, resulting in loss of the aircraft. When $N_{p2}$ is equal to 7, 8 or 9: there is a reduction in the handleability of the aircraft with a possibility of loss of the aircraft. When $N_{p2}$ is equal to 10: there is a risk of poor interpretation of current altitude of the aircraft with a possibility of loss of the aircraft.

Advantageously, the alert messages are audible messages.
Advantageously, the alert messages are visual messages.
Advantageously, the alert messages comprise a DO_LIST action procedure.

The action procedure draws up a list of actions to be undertaken so that the command of the aircraft is returned to the operator Advantageously, the vehicle is a pilotless aircraft and the operator pilots the aircraft from outside the aircraft.

Advantageously, the vehicle is an aircraft and the operator is a pilot on board the aircraft.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for aiding the restoral of command of a moving vehicle to an operator of the vehicle, the command of the vehicle by the operator being ensured through piloting controls CP acting on piloting means, the operator having lost command of the vehicle in favor of a device for disabling piloting controls CP, the device disabling the action of the piloting controls CP on the piloting means during the loss of command, wherein the method comprises the following steps:
Step A: Emitting a request to restore command of the vehicle destined for the operator;
Step B: Determining a vehicle motion phase $P_M$;
Step C: For each piloting control CP, determining a reference state $S_R$ of the piloting control CP as a function of the motion phase $P_M$;
Step D: For each piloting control CP, determining a current state $S_C$ of the piloting control CP;
Step E: For each piloting control CP, comparing the current state $S_C$ with the reference state $S_R$, so as to identify any deviation between the current state and the reference state;
Step F: When no deviation is identified in all piloting controls CP, the command of the vehicle by the operator is restored;
Step G: When a deviation is identified in any of the piloting controls CP, determining alert messages for warning the operator of the identified deviation and associating a priority level with each alert message; and
Step H: Repeating steps B to G after performing the Step G.

2. A method according to claim 1, wherein a deviation of one of the piloting controls CP is identified when a difference between a reference state $S_R$ and a current state $S_C$ of the one of the piloting controls CP is different from 0.

3. A device for aiding the restoral of command of a moving vehicle to an operator of the vehicle, the device comprising:
a receiver configured to receive a restoral of command authorization cue; and
a storage device configured to store reference states $S_R$ of piloting controls CP of the moving vehicle as a function of a vehicle motion phase $P_M$;
wherein the device is configured to determine current states $S_C$ of the piloting controls CP, to determine the vehicle motion phase $P_M$, to compare a current state $S_C$ of one of the piloting controls CP with a reference state $S_R$ of the one of the piloting controls CP, and to identify a deviation between the current state $S_C$ of the one of the piloting controls CP and the reference state $S_R$ of the one of the piloting controls CP,
wherein the device further comprises an alerting device configured to generate alert messages to be communicated to the operator and associating a priority level with the messages, the alert messages warning the operator of the existence of the identified deviation.

4. The device for aiding the restoral of command of a vehicle according to claim 3, wherein the device is integrated with a vehicle failure message management device.

5. The device for aiding the restoral of command of a vehicle according to claim 4, wherein the vehicle is an aircraft and in that the operator is on board the aircraft.

6. The device for aiding the restoral of command of a vehicle according to claim 4, wherein the vehicle is a pilotless aircraft and in that the operator pilots the aircraft from outside the aircraft.

7. The device for aiding the restoral of command of a vehicle according to claim 3, wherein the alert messages are audible messages.

8. The device for aiding the restoral of command of a vehicle according to claim 7, wherein the vehicle is an aircraft and in that the operator is on board the aircraft.

9. The device for aiding the restoral of command of a vehicle according to claim 7, wherein the vehicle is a pilotless aircraft and in that the operator pilots the aircraft from outside the aircraft.

10. The device for aiding the restoral of command of a vehicle according to claim 3, wherein the alert messages are visual messages.

11. The device for aiding the restoral of command of a vehicle according to claim 10, wherein the vehicle is an aircraft and in that the operator is on board the aircraft.

12. The device for aiding the restoral of command of a vehicle according to claim 10, wherein the vehicle is a pilotless aircraft and in that the operator pilots the aircraft from outside the aircraft.

13. The device for aiding the restoral of command of a vehicle according to claim 3, wherein the alert messages comprise a DO_LIST action procedure.

14. The device for aiding the restoral of command of a vehicle according to claim 13, wherein the vehicle is an aircraft and in that the operator is on board the aircraft.

15. The device for aiding the restoral of command of a vehicle according to claim 13, wherein the vehicle is a pilotless aircraft and in that the operator pilots the aircraft from outside the aircraft.

16. The device for aiding the restoral of command of a vehicle according to claim 3, wherein the vehicle is an aircraft and in that the operator is on board the aircraft.

17. The device for aiding the restoral of command of a vehicle according to claim 3, wherein the vehicle is a pilotless aircraft and in that the operator pilots the aircraft from outside the aircraft.

* * * * *